(12) United States Patent
Pichlmaier et al.

(10) Patent No.: US 11,691,516 B2
(45) Date of Patent: Jul. 4, 2023

(54) SYSTEM AND METHOD OF CAPACITANCE CONTROL

(71) Applicant: AGCO International GmbH, Neuhausen (CH)

(72) Inventors: Benno Pichlmaier, Munich (DE); Andreas Szajek, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 136 days.

(21) Appl. No.: 17/287,985

(22) PCT Filed: Oct. 17, 2019

(86) PCT No.: PCT/EP2019/078199
§ 371 (c)(1),
(2) Date: Apr. 22, 2021

(87) PCT Pub. No.: WO2020/083739
PCT Pub. Date: Apr. 30, 2020

(65) Prior Publication Data
US 2021/0370778 A1    Dec. 2, 2021

(30) Foreign Application Priority Data

Oct. 24, 2018    (GB) .................................... 1817298

(51) Int. Cl.
*B60L 3/00*        (2019.01)
*B60L 3/04*        (2006.01)
*B60R 16/023*    (2006.01)

(52) U.S. Cl.
CPC ........... *B60L 3/0046* (2013.01); *B60L 3/0061* (2013.01); *B60L 3/0069* (2013.01); *B60L 3/04* (2013.01);
(Continued)

(58) Field of Classification Search
CPC .... B60L 3/0046; B60L 3/0061; B60L 3/0069; B60L 3/04; B60L 2200/40; B60R 16/0238; B60Y 2200/221
See application file for complete search history.

(56) References Cited

U.S. PATENT DOCUMENTS

2017/0120709 A1*  5/2017  Tuttle .................... A01B 59/002
2018/0208058 A1*  7/2018  Czapka .................. B60K 31/00
2020/0120854 A1*  4/2020  Shearer .................. A01B 63/32

OTHER PUBLICATIONS

UK Intellectual Property Office, Search Report for priority Application No. GB1817298.1, dated Apr. 12, 2019.
(Continued)

*Primary Examiner* — Jared Fureman
*Assistant Examiner* — Duc M Pham

(57) ABSTRACT

A system and method of capacitance management in an agricultural vehicle and connected implement, wherein the vehicle and implement have a plurality of electric drives connected to a common connection and connectable to a direct current supply, and each electric drive has an associated Y capacitor between each direct current supply connection and the common connection, wherein the method includes receiving and summing capacitance values for each of the electric drives and comparing with a stored threshold value. If the threshold value is exceeded, a sequence of selective disconnections of individual electric drives is performed until the sum of the received capacitance values is less than or equal to the threshold value. The method may be performed manually, or automatically based on a sequence defined in a priority list until the sum of the received capacitance values is less than or equal to the threshold value.

9 Claims, 3 Drawing Sheets

(52) U.S. Cl.
CPC ....... *B60R 16/0238* (2013.01); *B60L 2200/40* (2013.01); *B60Y 2200/221* (2013.01)

(56) References Cited

OTHER PUBLICATIONS

European Patent Office, International Search Report for International Application No. PCT/EP2019/078199, dated Jan. 15, 2020.
Stephens et al., "Hydrogen Fuel Cell Vehicle Electrical Protective Barrier Option: Fuel System Safety", dated May 2015 found @https://www.nhtsa.gov/sites/nhtsa.gov/files/812134-hydrogenfuelcellvehelecprotbaroptfuelsyssfty.pdf.
ISO 6469-3:2018 "Electrically propelled road vehicles—Safety specifications—Part 3: Electrical safety" ISO 6469-3; Published Oct. 1, 2018, pp. 1-20; found on the Internet: URL:https://www.iso.org/standard/68667.html.
United Nations, Global Technical Regulation on the Electric Vehicle Safety (EVS), Published May 3, 2018, found on the internet @ https://www.unece.org/trans/main/wp29/wp29wgs/wp29gen/wp29registry/ECE-TRANS-180a20e.pdf.
ISO 6469-4:2015 "Electrically propelled road vehicles—Safety specifications—Part 4: Post crash electrical safety", Published Sep. 1, 2015, pp. 1-15, on the Internet: URL:https://www.iso.org/standard/60584.html.
National Highway Traffic Safety Administration; 49 CFR 571.305-Standard No. 305; "Electric-powered vehicles: electrolyte spillage and electrical shock protection", Published Oct. 1, 2011, @ https://www.govinfo.gov/content/pkg/CFR-2011-title49-vol6-sec571-305.pdf.

\* cited by examiner

SYSTEM AND METHOD OF CAPACITANCE CONTROL

FIELD

The invention relates to electrical power management and electrical safety features in vehicles especially, although not exclusively, in agricultural vehicles such as tractors when connected to an agricultural implement such as a planter or baler.

BACKGROUND

There is an increasing trend towards electric power in agricultural vehicles such as farm tractors. Even with hybrid drive vehicles, there is increased use of electric drives to perform functions on agricultural vehicles and connected implements previously performed by hydraulic power produced by the vehicle.

Typically the power will be produced as an alternating current (AC) in an on-board generator of the vehicle driven by the vehicles main motive power unit, whether an electric motor or internal combustion engine. The AC output from the generator is typically converted to direct current (DC) for supply to drives such as HVAC (heating, ventilation, air-conditioning) and engine cooling fans on the vehicle and, via a high voltage connection between a coupled and towed implement, to further electric drives on the implement. Typically, the DC supply will have a voltage level at class B according to International Standard ISO 6469-4 (Electrically propelled road vehicles—safety specifications—part 4: voltage classes). This voltage, which may be in the region of 550-800V, will be inverted at each electric drive to provide an AC supply.

As is the case with electrical systems in general, and electrical vehicles in particular, safety considerations drive protective measures to avoid accidental electrocution of vehicle users coming into contact with "live" vehicle components. A particular factor to be considered is leakage and other capacitances associated with each of the electric drives which can accumulate to deliver dangerous leakage currents in the form of a discharge to ground through a user inadvertently touching a live component.

According to International Standard ISO 6469-3 (Electrically propelled road vehicles—safety specifications—part3: protection of persons against electric shock) one or more of the following measures must be fulfilled (minimal requirement in normative reference):
- energy of the total capacitance between any energized voltage class B live part and the electric chassis shall be <0.2 J at is maximum working voltage.
- double or reinforced insulation instead of basic insulation.
- one or more layers of insulation, barriers and/or enclosures in addition to the basic protection.
- rigid barriers/enclosures with sufficient mechanical robustness and durability, over the vehicle service life.

In case of a closed system, such as a stand-alone vehicle without attachments, it might be easier to encapsulate the system electrically than guaranteeing not to exceed certain capacitance limits. However, this is not possible for an open tractor-implement system, where a variety of different implements (with different capacitive characteristics and physical configurations) may be coupled to an agricultural vehicle. In such systems, it is also more likely that a user will be touching parts of the vehicle and or implement, for general set-up or maintenance, with an increased likelihood that contacts are touchable without special tools.

BRIEF SUMMARY

In accordance with a first aspect of the invention there is provided a system of an agricultural vehicle and a connected implement, wherein each of the vehicle and implement has a plurality of electric drives each of which is electrically connected to a common connection of the system and is electrically connectable to a direct current supply of the system, wherein each electric drive has an associated Y capacitor between a direct current supply connection and the common connection, the system further comprising an electronic controller coupled with a data store holding a threshold value, wherein the controller is coupled to receive capacitance values for each of the electric drives and is arranged to sum the received capacitance values, to compare the magnitude of the sum with the stored threshold value and, where the threshold value is exceeded, to perform a predetermined action.

Preferably, the predetermined action is to automatically perform a predetermined sequence of selectively electrically disconnecting individual electric drives from the direct current supply until the magnitude of the sum of the received capacitance values is less than or equal to the threshold value. In such an arrangement, the data store suitably holds a priority list identifying the plurality of electric drives of the system in sequence, and the predetermined sequence of electrical disconnection performed by the electronic controller comprises firstly disconnecting all currently inactive electric drives and subsequently, if the magnitude of the sum of the received capacitance values is still greater than the threshold value, sequentially disconnecting the remaining electric drives in the sequence defined in the priority list until the magnitude of the sum of the received capacitance values is less than or equal to the threshold value.

Advantageously, the capacitance values for each electric drive received by the electronic controller comprise both Y capacitor and parasitic capacitance components, although the parasitic capacitance components may be negligible in comparison with the Y-capacitors.

Preferably, the system further comprises an ISOBUS connection between the electronic controller and each of the electric drives by means of which the controller receives the capacitance values and controls the selective electrical connection and disconnection of the electric drives.

Preferably, the selective electrical connection and disconnection of individual electric drives with the direct current supply is by respective high voltage relay devices switched by the electronic controller.

The system may further comprise one or more further electric drives electrically connected to the common connection of the system and the direct current supply of the system, wherein each further electric drive has an associated Y capacitor connectable between each direct current supply connection and the common connection, and the electronic controller is further operable to selectively make or break the electrical connection between a Y capacitor and the common connection.

As an alternative to automatic pre-programmed disconnection of the electric drives, the system may include a user interface device coupled with the electronic controller, and the predetermined action is the presentation to a user a selectable menu of the electric drives, by means of which menu the user can selectively electrically disconnect individual electric drives from the direct current supply. In such an arrangement, which gives the user manual control of the disconnection process, the electronic controller is suitably arranged to indicate to the user, via the user interface device, when the sum of the received capacitance values falls below the threshold value.

The common connection may be a zero voltage line between positive and negative direct current supply lines, or it may be an electrical ground connection. Typically the connection of all conductive chassis parts forms the common connection, which is called equipotential bonding connection.

Also in accordance with the present invention there is provided a method of capacitance budget management in a system of an agricultural vehicle and a connected implement, wherein each of the vehicle and implement has a plurality of electric drives electrically connected to a common connection of the system and electrically connectable to a direct current supply of the system, and wherein each electric drive has an associated Y capacitor between each direct current supply connection and the common connection, the method comprising:

receiving capacitance values for each of the electric drives;

summing the received capacitance values and comparing the magnitude of the sum with a stored threshold value; and where the threshold value is exceeded, performing a sequence of selectively electrically disconnecting individual electric drives from the direct current supply until the magnitude of the sum of the received capacitance values is less than or equal to the threshold value.

Preferably, the sequence of electrical disconnection is a predetermined sequence comprising firstly disconnecting all currently inactive electric drives and subsequently, if the magnitude of the sum of the received capacitance values is still greater than the threshold value, sequentially disconnecting the remaining electric drives in a sequence defined in a priority list until the magnitude of the sum of the received capacitance values is less than or equal to the threshold value.

As indicated above, the sequence of electrical disconnection may be performed manually or automatically.

DESCRIPTION OF THE DRAWINGS

Embodiments of the present invention will now be described by way of example only, and with reference to the accompanying drawings, in which.

Figure 1:
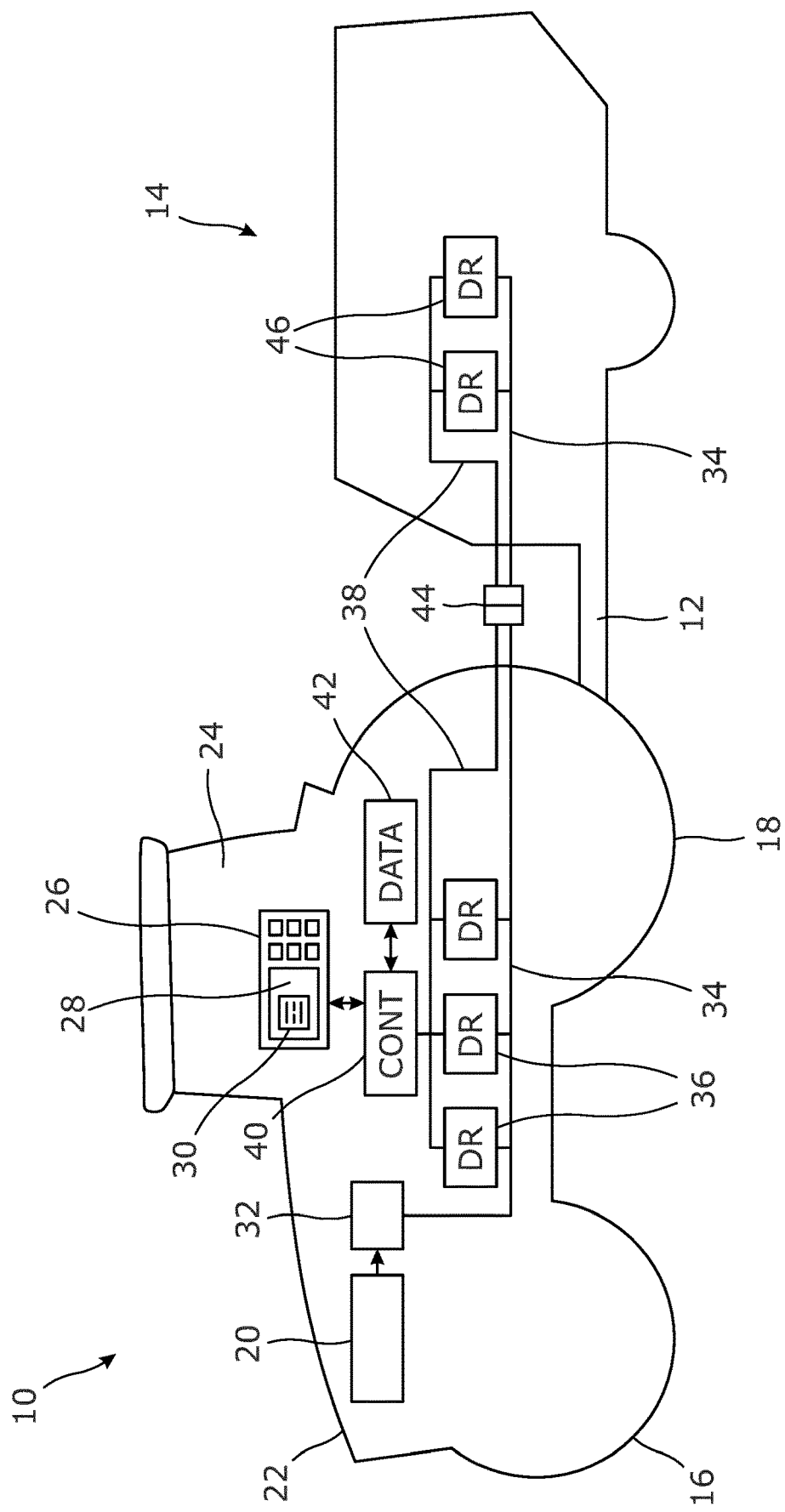
FIG. 1 schematically represents an agricultural vehicle and a connected implement having a plurality of electric drives.

The drawing figures do not limit the present invention to the specific embodiments disclosed and described herein. The drawings are not necessarily to scale, emphasis instead being placed upon clearly illustrating the principles of the invention.

DESCRIPTION OF EMBODIMENTS

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the invention as defined by the attached claims. The following description is, therefore, not to be taken in a limiting sense.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, FIG. 1 schematically represents an agricultural vehicle 10 in the form of a tractor coupled via a rear hitch 12 to a trailed implement 14, such as a baler or planter. The tractor has front 16 and rear 18 wheels, with at least the rear wheels driven by a motive power unit 20 under hood 22. A user station in the form of a vehicle cab 24 includes user operable controls for operating the vehicle, including a user interface device 26 including a display screen 28 (suitably a touch-screen device) on which may be displayed one or more menu screens 30 from which the user may select items, as will be described further below.

The motive power unit 20 drives a generator 32 which delivers power on lines 34 to a number of electric drives 36 on the tractor, such as for cooling fans, wiper motors etc. Each of the electric drives 36 is also connected via a data communication line 38 to an electronic controller 40. The data communication line 38 may comprise a CAN bus or ISOBUS link, or other suitable transfer mechanism such as Ethernet. The electronic controller 40 is operable to control each of the electric drives 36 via the data communication line 38, including connecting/disconnecting the drives 36 from the power supply on lines 34, and to receive data about each of the drives 36 (discussed further below). The electronic controller 40 is connected to, and controls operation of, the user interface device 26. The electric controller 40 is further connected with a data storage device 42, which storage device may hold data retrieved from the electric drives 36, together with control programs which may be loaded to the electric controller 40 to control operation of the same. As will be understood, the electronic controller 40 may perform additional functions on the vehicle, such as engine management, guidance/auto-steering etc.

At the rear of the vehicle, an electrical connector 44 connects both the power supply lines 34 and data communication line 38 to a number of further electric drives 46 on the towed implement 14.

Figure 2:
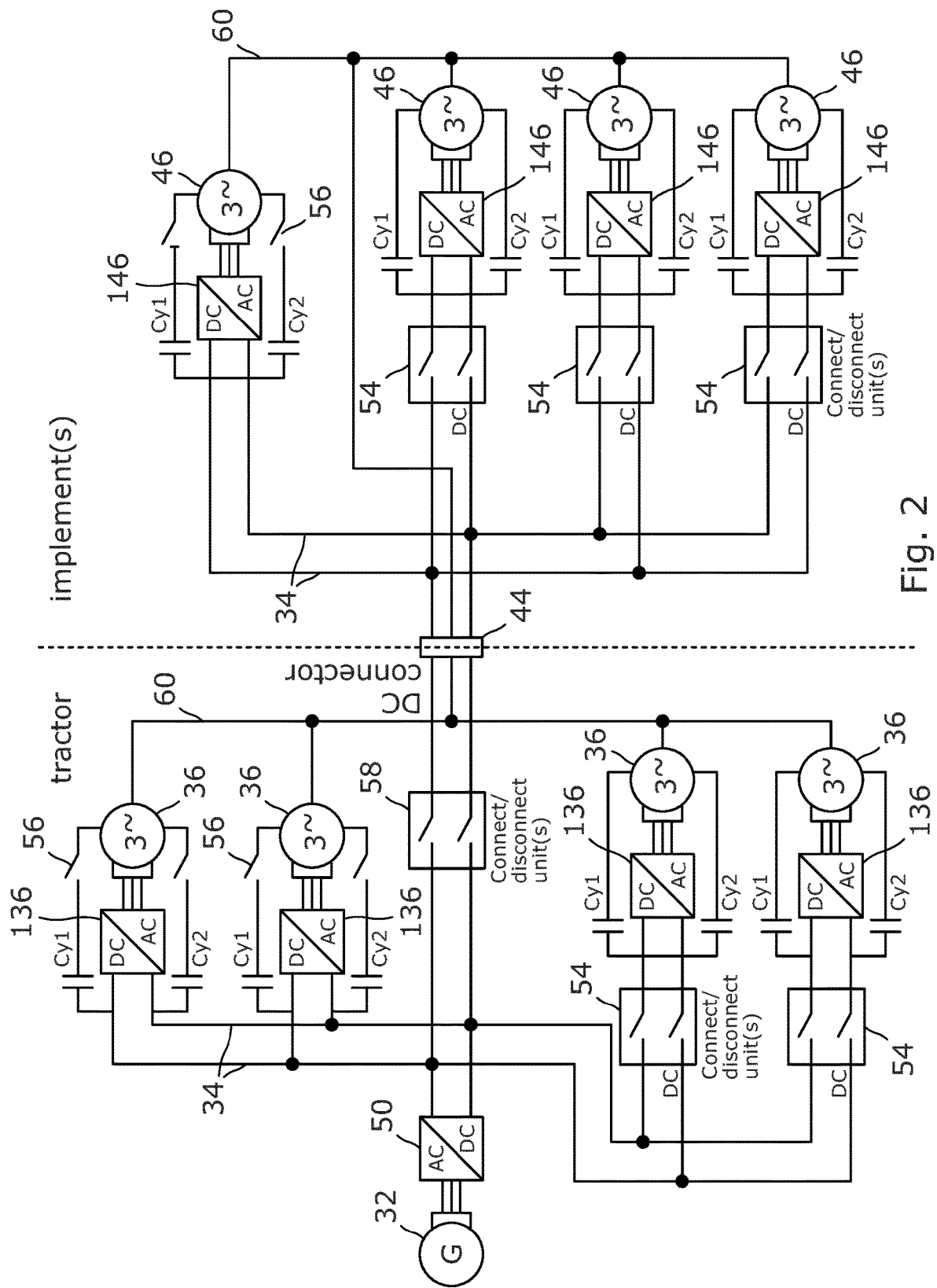
FIG. 2 is a circuit schematic of the power connections of the electric drives of FIG. 1.

FIG. 2 shows the components of the power supply to the electric drives 36, 46 in greater detail, with the AC output from generator 32 passing through an inverter 50 to provide DC on the lines 32. Each of the electric drives 36 on the tractor is connected to the power lines 32 via a respective inverter 136 to provide an AC supply to the drive. Between each of the DC lines 32 and each of the drives 36 there is provided a respective Y capacitor Cy1, Cy2.

As shown for the two electric drives 36 in the lower part of FIG. 2, isolation from the power supply lines 32 may be provided by high voltage (HV) relay devices 54 switched by the electronic controller 40. To avoid the risk of arcing, HV relays are used in both DC-lines to cut off the current flow to provide a real galvanic isolation: suitable HV relays are filled with inert gas and equipped with a spark gap designed as meander.

As some electric drives 36 must not be disconnected from the power supply, it is still possible to reduce the capacitive load by disconnecting the Y capacitors Cy1, Cy2 by means of switches 56 in the line between the power line 32 and drive 36, as shown for the two drives in the upper part of FIG. 2.

In like manner, each of the electric drives 46 on the implement is connected to the power lines 32 via a respective inverter 146 to provide an AC supply to the drive them, and some of the electric drives 46 on the implement 14 may be fully isolated by high voltage relay devices 54 switched by the electronic controller 40, whilst others may simply have the Y capacitors disconnected.

A further high voltage relay device 58 may be provided prior to the connector 44 to completely cut off the power supply to the implement 14.

Where the electric drives 36, 46 of the tractor and implement operate in 3 phase, the star points by a line 60 (via connector 44) providing a common connection.

Figure 3:
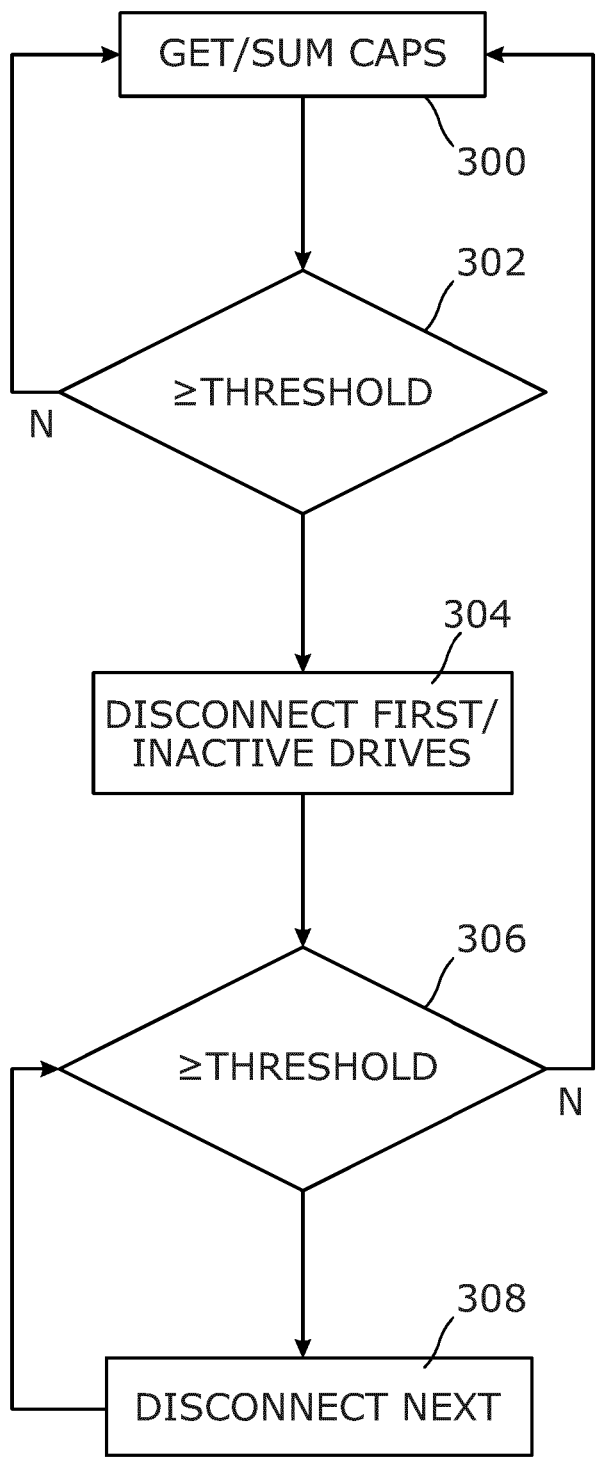
FIG. 3 is a flow chart representation of a method of capacitance budget management embodying the present invention.

FIG. 3 illustrates a method of capacitance budget management in the system of an agricultural vehicle and a connected implement as shown in FIG. 1. The method begins at step 300 with receiving the capacitance values for each of the electric drives 36, 46 and summing them. At step 302, the magnitude of the received and summed capacitance values is compared with a stored threshold value (held in data store 42). If the magnitude of the received and summed capacitance values is less than or equal to the threshold value, no action is needed and the process reverts to step 300.

The threshold value represents a difference between zero and a maximum capacitance value MC for the system. Determining whether the threshold is exceeded may be achieved by adding up received capacitance values (to see if the total is greater than MC), or subtracting received capacitance values from MC (to see if the result is less than zero).

When step 302 determines that the threshold value is exceeded, the process moves to step 304 with commencement of a sequence of selectively electrically disconnecting individual electric drives from the direct current supply until the magnitude of the sum of the received capacitance values is less than or equal to the threshold value. The selection of a first drive to be disconnected may be performed automatically by the electronic controller 40 based on a priority list (specifying an order for disconnections) held in the data store, suitably following receipt from the implement or from the manufacturer of the implement. Suitably the first specified drive for disconnection may comprise all currently inactive drives on both tractor and implement.

Instead of implementing an automated disconnection sequence, the electronic controller 40 may instead present a list of the drives to a user via a menu 30 on the user interface device (suitably accompanied by an indication of the capacitive load for each) and allow the user to select which to disconnect.

After the first disconnection operation at step 304, a further check of the magnitude of summed capacitance values against the threshold is made at step 306. If the magnitude of the received and summed capacitance values is now less than or equal to the threshold value, no further action is needed and the process reverts to step 300.

If the check at step 306 indicates that the threshold is still exceeded, the process moves to step 308 at which a further drive is disconnected—either automatically by the electronic controller 40, or by the user in response to a system request via the user interface device 26—following which the process reverts to step 306. Steps 306 and 308 continue in a loop, disconnecting successive drives, until step 306 determines that the magnitude of the received and summed capacitance values is now less than or equal to the threshold value, such that no further action is needed, and the process reverts to step 300.

In the foregoing the applicants have described a method of capacitance budget management in a system of an agricultural vehicle and a connected implement, wherein each of the vehicle and implement has a plurality of electric drives electrically connected to a common connection of the system and electrically connectable to a direct current supply of the system, and wherein each electric drive has an associated Y capacitor between each direct current supply connection and the common connection. The method comprises receiving and summing capacitance values for each of the electric drives 300, and comparing with a stored threshold value 302. If the threshold value is exceeded, a sequence of selective electrical disconnections of individual electric drives is performed 304, 308 until the sum of the received capacitance values is less than or equal to the threshold value. The method may be performed manually, or automatically based on a sequence defined in a priority list until the sum of the received capacitance values is less than or equal to the threshold value. A system configured to implement the method is also provided.

From reading of the present disclosure, other modifications will be apparent to those skilled in the art and the scope of the invention is limited only by the following claims.

The invention claimed is:

1. A system of an agricultural vehicle and a connected implement, wherein the vehicle and the implement each have a plurality of electric drives wherein each drive is electrically connected to a common connection of the system and electrically connectable to a direct current supply of the system, and having an associated Y capacitor between a connection to the direct current supply and the common connection, the system further comprising an electronic controller and a data store holding a threshold value, wherein the controller is configured to receive capacitance values from each of the electric drives, sum the received capacitance values, compare the sum with the threshold value and, when the threshold value is exceeded, perform a predetermined action, wherein the predetermined action comprises performing a predetermined sequence of selectively disconnecting individual electric drives from the direct current supply until the sum of the received capacitance values is less than or equal to the threshold value, wherein the system further comprising one or more further electric drives electrically connected to the common connection and the direct current supply, wherein each further electric drive has an associated Y capacitor connectable between the direct current supply and the common connection, and the controller is further configured to selectively connect or disconnect the Y capacitor from the common connection.

2. The system of claim 1, wherein the data store holds a priority list of the plurality of electric drives, and the predetermined sequence of selectively disconnecting individual electric drives comprises firstly disconnecting inactive electric drives and when the sum of the received capacitance values is greater than the threshold value, subsequently disconnecting the individual electric drives in the sequence defined in the priority list until the sum of the received capacitance values is less than or equal to the threshold value.

3. The system of claim 1, wherein the received capacitance values are comprised of both Y and parasitic capacitance components.

4. The system of claim 1, further comprising a CAN bus or ISOBUS connection between the controller and each of the electric drives by which the controller receives the capacitance values and controls connection and disconnection of the individual electric drives.

5. The system of claim 1, wherein selective connection and disconnection of the individual electric drives from the direct current supply is by a respective high voltage relay controlled by the controller.

6. The system of claim 1, further comprising a user interface coupled with the controller wherein the predetermined action is presented through the user interface as a selectable menu of the electric drives, to selectively disconnect the individual electric drives from the direct current supply.

7. The system of claim 6, wherein the controller is configured to indicate through the user interface, when the sum of the received capacitance values falls below the threshold value.

8. The system of claim 1, wherein the common connection is an electrical ground connection.

9. The system of claim 8, wherein the electrical ground connection is an equipotential bonding connection between conductive parts of a chassis of the vehicle.

* * * * *